United States Patent
Zaffaroni

[11] 3,921,636
[45] *Nov. 25, 1975

[54] NOVEL DRUG DELIVERY DEVICE

[75] Inventor: Alejandro Zaffaroni, Atherton, Calif.

[73] Assignee: Alza Corporation, Palo Alto, Calif.

[ * ] Notice: The portion of the term of this patent subsequent to Aug. 10, 1988, has been disclaimed.

[22] Filed: Apr. 22, 1974

[21] Appl. No.: 462,895

Related U.S. Application Data

[63] Continuation of Ser. No. 323,370, Jan. 15, 1973, which is a continuation-in-part of Ser. No. 169,974, Aug. 9, 1971, abandoned.

[52] U.S. Cl. .............. 128/260; 128/130; 128/263; 128/268; 128/270; 128/264; 424/19
[51] Int. Cl.² .............. A61F 13/20; A61M 31/00; A61F 5/46
[58] Field of Search ........ 128/2 R, 335.5, 260, 268, 128/270, 271, 156, 130; 424/16, 19, 22, 28

[56] References Cited
UNITED STATES PATENTS

| | | | |
|---|---|---|---|
| 3,053,255 | 9/1962 | Meyer | 128/268 |
| 3,220,960 | 11/1965 | Wichterle | 260/2.5 M |
| 3,279,996 | 10/1966 | Long, Jr. et al. | 128/335.5 |
| 3,426,754 | 2/1969 | Bierenbaum et al. | 128/268 X |
| 3,429,827 | 2/1969 | Ruus | 424/19 |
| 3,464,413 | 9/1969 | Goldfarb et al. | 128/268 |
| 3,490,454 | 1/1970 | Goldfarb et al. | 128/260 X |
| 3,521,637 | 7/1970 | Waterbury | 128/270 |
| 3,598,123 | 8/1971 | Zaffaroni | 128/268 |
| 3,632,416 | 1/1972 | Shepherd et al. | 128/335.5 |
| 3,691,271 | 9/1972 | Charle et al. | 128/270 |

Primary Examiner—Aldrich F. Medbery
Attorney, Agent, or Firm—Thomas E. Ciotti; Paul L. Sabatine; Edward L. Mandell

[57] ABSTRACT

A drug delivery device for administering drug at a controlled rate for a prolonged period of time is disclosed. The device comprises a plurality of reservoirs containing drug distributed through a matrix. The reservoirs and the matrix are formed of materials permeable to passage of drug. The rate of drug permeation (release) from the reservoir is lower than the rate of permeation through the matrix so that release from the reservoir is the drug release rate controlling step.

13 Claims, 8 Drawing Figures

NOVEL DRUG DELIVERY DEVICE

This is a continuation of application Ser. No. 323,370, filed Jan. 15, 1973, which in turn is a continuation-in-part of application Ser. No. 169,974, filed Aug. 9, 1971 and now abandoned.

BACKGROUND OF THE INVENTION

1. Field of the Invention

This invention relates to a drug delivery device; more particularly, it concerns a device for releasing drug at a controlled rate for a prolonged period of time.

2. The Prior Art

In many therapeutic programs it is desirable to administer a drug at a controlled rate over a prolonged period of time. In many instances the rate of drug administration should have a substantially zero order time dependence, that is, it should be constant - independent of time.

Different approaches have been tried by the prior art to obtain a drug delivery device which will yield a substantially zero order release. One approach has been to mix a drug with a carrier material that is gradually boken down by body fluids. The drug is released as the carrier erodes. Waxes, oils, fats, soluble polymers, and the like have been used as carriers in such devices. While these devices provide a delayed release of the drug, a constant release rate for a prolonged period is not obtained. One reason for this is that as the carrier erodes the surface area of the dosage unit decreases. This inherently results in a decline in the release rate.

Another approach to this problem has been to disperse drug throughout a solid matrix through which the drug may diffuse. This type of drug delivery device also has proven incapable of providing a zero order drug release rate, instead giving a release rate which is inversely proportional to $(time)^{1/2}$; J. Pharm. Sci., Vol 52, pages 1,145 to 1,149, 1963.

Still another approach has been to enclose drug within a single capsule having a polymeric wall through which the drug can diffuse. Generally, as for example in U.S. Pat. No. 3,279,996, these devices have employed as polymeric walls materials such as silicone rubber polymers which have very high permeabilities for certain drugs. This use of materials having high drug permeability prevents a uniform rate of drug release since the rate of permeation through the material is higher than the rate of drug clearance from the outer surface of the capsule. This results in the rate limiting step being clearance of the drug from the exterior of the capsule, which is difficult to control and subject to frequent change, rather than diffusion through the capsule wall. In applicant's own U.S. Pat. No. 3,598,122, an improved variation of such a capsule device is disclosed. This variation involves the use of a lower permeability outer wall so that the rate of diffusion through the wall is in fact the rate limiting step. The devices of that patent, while representing a major advance over the prior art, did at times have difficulties since different devices having different drug release rates often were not readily made without experimentation; also the devices could at times require difficult precision fabrication from difficult to handle materials.

It is also known to surround drug with certain types of microcapsules to delay drug release as shown, for example, in U.S. Pat. No. 3,464,413. The microcapsules of the prior art do not give a sustained or zero order rate of drug release. As pointed out in U.S. Pat. No. 3,464,413, these capsules rupture upon administration, causing their encapsulated medicament to be discharged in a burst. In certain embodiments, prior microcapsules could be microporous, in which case some medicament might escape from the devices by leakage or evaporation, nonetheless, the release instead of being controlled and constant, would still be essentially by a burst-like rupture, the evaporation or leakage not functioning by diffusion or yielding a constant rate of drug release. Thus, these types of capsule devices were not suitable for releasing drug at a controlled and preferably constant rate for a prolonged period of time.

STATEMENT OF THE INVENTION

Accordingly, it is an immediate object of this invention to provide a drug delivery device for releasing drug at a controlled, and preferably constant, rate for a prolonged period of time.

Another object of this invention is to provide a drug delivery device which is of simple construction and which enables simple modification of drug release rate.

In accomplishing these objects the present invention provides a drug delivery device comprising a drug-permeable matrix containing a plurality of drug reservoirs, each of which reservoirs comprise drug surrounded by a drug release rate controlling materials. The rate of drug permeation through the release rate controlling material is lower than the rate of drug permeation through the matrix. While other embodiments are contemplated as well, it is very suitable for the reservoirs to take the form of drug microencapsulated with release rate controlling material. The release rate controlling material may be essentially imperforate so that drug is released by diffusing directly through the material or the maerial may contain fluid-filled micropores in which case the drug may diffuse through the fluid pore filling or through the material itself.

BRIEF DESCRIPTION OF THE DRAWINGS

In the drawings wherein like parts are identified by like numbers.

DETAILED DESCRIPTION OF THE DRAWINGS

Figure 1:
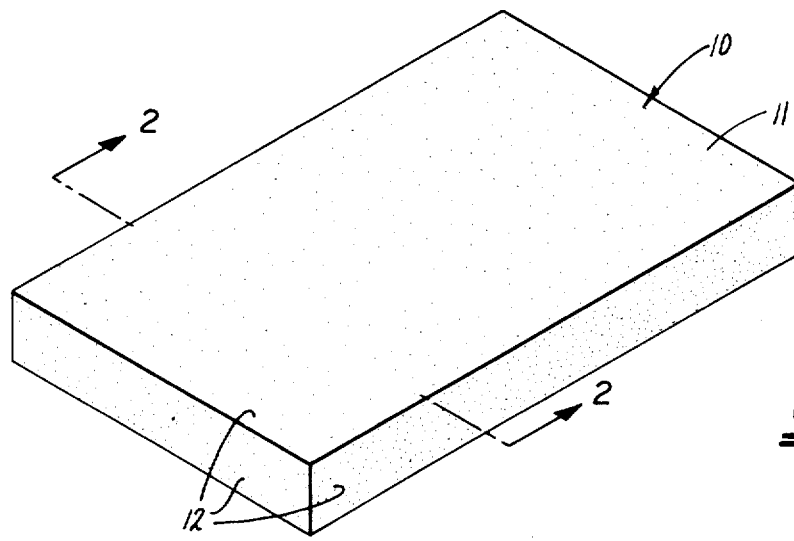
FIG. 1 is a perspective view of a drug delivery device of the invention.
Figure 2:
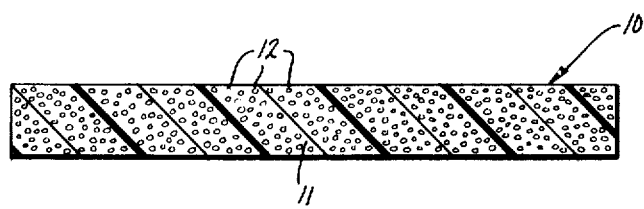
FIG. 2 is a cross-sectional view at 2—2 of the drug delivery device of FIG. 1.

FIGS. 1 and 2 depict a representative device of this invention, drug delivery device 10. Drug delivery device 10 is comprised of a matrix 11 having dispersed therethrough a plurality of reservoirs 12. Reservoirs 12 are comprised of a drug confined within a drug release rate controlling material permeable to the passage of the drug by diffusion or by microporous flow. Passage of drug through a release rate controlling material is defined to occur by diffusion when the rate controlling material is essentially non-porous and the drug molecules dissolve in and diffuse through the material itself. Drug passage is defined to occur by microporous flow when the rate controlling material contains microporous pinholes or cracks filled with a liquid phase and the drug diffuses through the liquid phase present in the micropores and the like. Matrix 11 is also permeable to passage of the drug. Critically, however, the rate of passage (by diffusion or microporous flow) of drug from reservoir 12 (that is, through the drug release rate controlling material) is lower than the rate of passage of drug through matrix 11. The rate of passage of drug from reservoir 12 is the rate limiting step for drug release from the device. Drug within reservoirs 12 may be in solid form, liquid form, in admixture with a carrier, in solution, etc.

Figure 3:
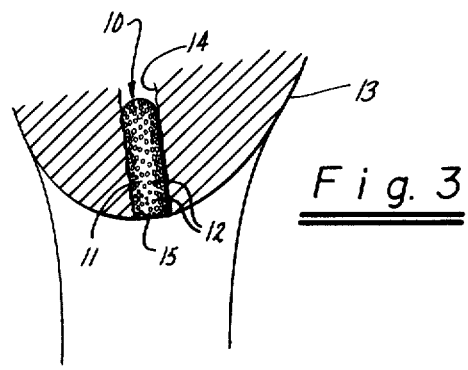
FIG. 3 is an elevational sectional view of an anal drug delivery device of the invention in use.

FIG. 3 illustrates another drug delivery device of the invention, device 10, a drug delivery device adapted for administering drug within the anal canal. Device 10 is shown positioned in anal canal 14 of body 13 located between the buttocks and terminating in anus 15. Device 10 has a matrix 11 having dispersed therethrough a plurality of reservoirs 12 each made up of drug confined within a drug release rate controlling material. Drug molecules are released from reservoirs 12 at a controlled rate and pass through matrix 11 to body 13.

Figure 4:
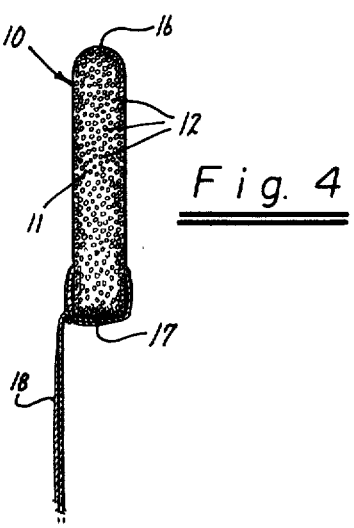
FIG. 4 is an elevational view of a drug delivery tampon embodying the principles of the invention.

FIG. 4 illustrates drug delivery device 10 of the invention, shaped as a cylindrical vaginal tampon. One end 16 of the tampon is rounded while the opposite end 17 is flat for easy insertion of the device into a vagina. The drug delivery tampon is equipped with cord 18 for removing the drug delivery tampon from the vagina after the desired degree of medication has been effected. Device 10 has a matrix 11 carrying therein a plurality of reservoirs 12 containing a drug. In operation, drug is released from the reservoir to the matrix, as discussed above, at a controlled rate and then passes through the latter into the vagina to achieve a desired physiological or pharmacological effect.

Figure 5:
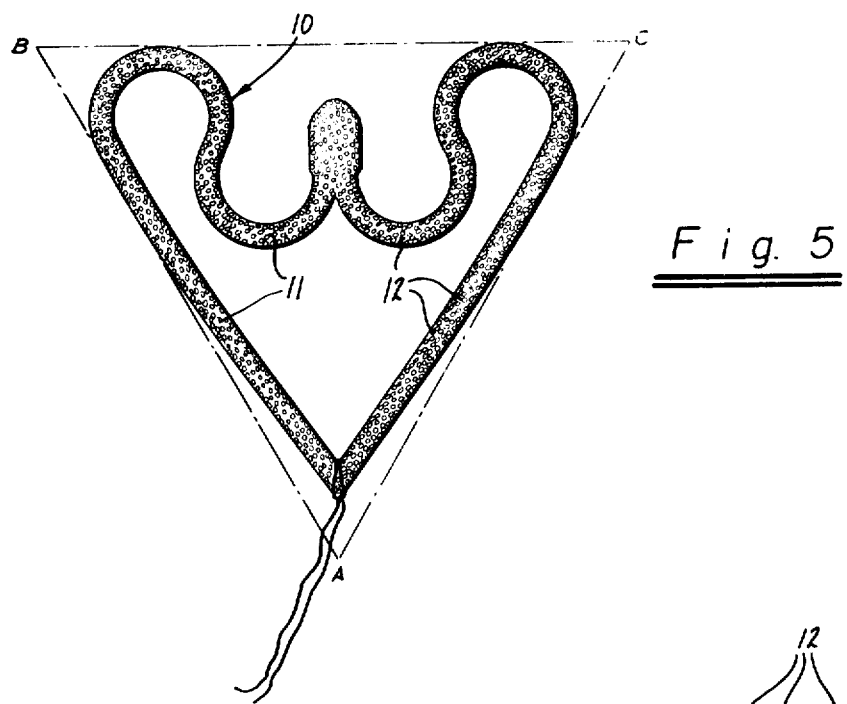
FIG. 5 is a front elevational view of an intrauterine drug delivery device according to the invention.

In FIG. 5, there is depicted an intrauterine contraceptive drug delivery device 10 according to the spirit of this invention. Device 10 comprises matrix 11 permeable to the passage of drug and having homogenously or heterogenously dispersed therein a plurality of reservoirs 12. Reservoirs 12 are formed of a wall member that confines a drug. Drug is released at a controlled rate from the reservoir by passage through this wall member and passes through matrix 11 to the uterus. The rate of drug release from the reservoir is the rate controlling step for drug release from the device. Intrauterine drug delivery device 10 is of triangular shape as defined by coordinates A, B, and C, with non-traumatising rounded corners for easy insertion into the uterine cavity.

Figure 6:
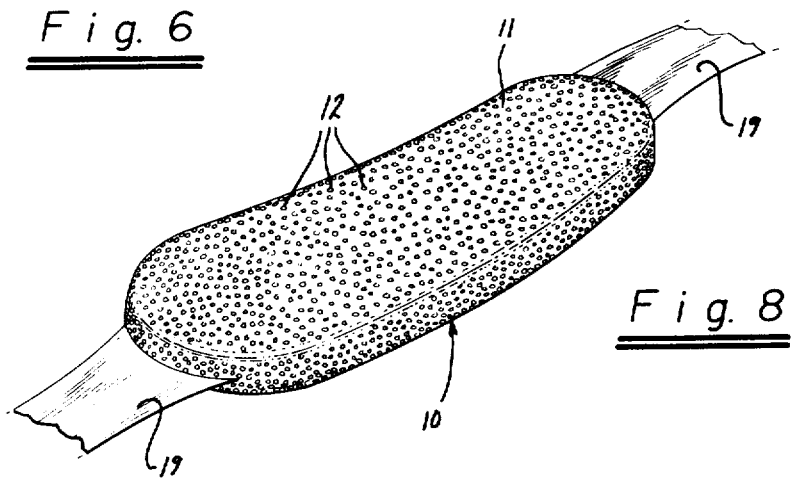
FIG. 6 is a schematic drawing showing a drug delivery device of this invention shaped as a tablet.

FIG. 6 is a schematic drawing of a pill or tablet drug delivery device 10 of the invention. This device 10 comprises a matrix material 11 and a plurality of reservoirs 12 formed of materials permeable to the passage of drug in the relation set forth for FIGS. 1 – 5. Pill or tablet drug delivery device 10 is suitable for oral administration and thus continuously meters drug to the gastrointestinal tract.

Figure 7:
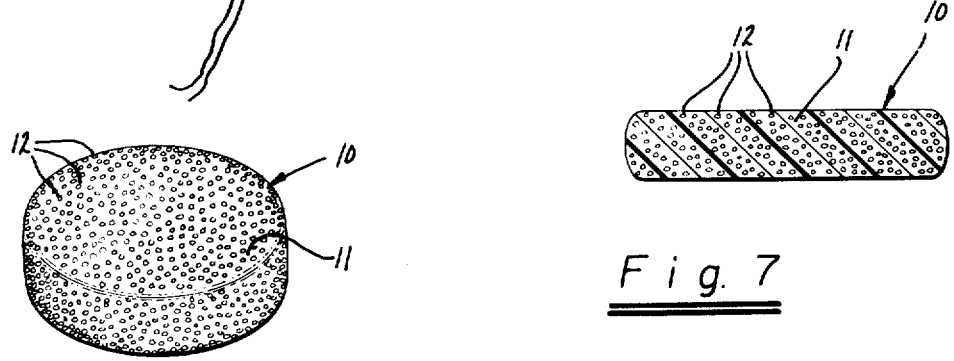
FIG. 7 is a longitudinal section through a drug delivering implant in accordance with this invention.

In FIG. 7, there is illustrated depot implant drug delivery device 10 comprising matrix 11 having dispersed therein reservoirs 12 confining a drag. When such a device is implanted it meters a constant and uniform flow of drug to the body.

Figure 8:
FIG. 8 is an isometric view of a catamenial pad embodiment of the instant drug delivery device.

FIG. 8 represents a drug delivery device 10 of catamenial shape which comprises a matrix 11 having a shape generally approximating the exterior surface of the pubic area. The catamenial is provided at its ends with tabs 19 for securing and maintaining it in position during the delivery of drug. Matrix 11 of device 10 has distributed therethrough reservoirs 12 containing a drug. The reservoirs 12 have walls which release drug at a controlled rate for a prolonged period of time to matrix 11. The drug passes through matrix 11 at this rate and is administered to the wearer.

While the above FIGS. 1 through 8 inclusive are illustrative of various drug delivery devices that can be made according to the invention, it is to be understood that the illustrated devices are not to be construed as limiting, as the drug delivery device of the invention can take shapes, sizes and forms for administering drug to different areas of the body. For example, the invention includes external and internal drug delivery devices such as skin patches, sublingual drug delivery devices, peroral devices, arterial devices, nasal and ear drug delivery devices, ocular inserts, suture materials, plastic heart valves, hip joints, bone pins, pessaries, prosthesis, artificial glands, cervical rings, troches, or intrauterine drug delivery devices of any shape. In each instance, the drug delivery device has a matrix containing a plurality of reservoirs containing drug. Both the matrix and the reservoir are permeable to the passage of drug by diffusion, and/or microporous flow with rate of permeation from the reservoir being lower than the rate of permeation through the matrix.

DETAILED DESCRIPTION OF THE INVENTION

The drug delivery device of this invention provides many important advantages over previously known drug delivery devices. One advantage of the device is its ease of construction by standard manufacturing techniques into devices of various sizes, shapes, forms and, more importantly, drug release rates. A wide range of drug release rates can be easily obtained by varying the number of reservoirs or the rate controlling wall material of the reservoirs while using a single matrix that contacts the body for administration of drug thereto.

Another important advantage of the invention resides in the drug delivery devices' ability to provide a substantially zero order ($dM_t/dt$=constant) rate of drug release throughout the major portion of the devices' drug release history. Also, if desired, the drug delivery device of this invention may be adapted to administer drug according to a predetermined drug-time release pattern, for example, sinusoidal, parabolic, and the like. The drug-time release pattern for the device of the invention is obtained by a selection of the drug release parameters, such as the thickness of the material forming the reservoir walls, the size of the reservoir, and the number of reservoirs.

In construction, the device can be viewed as a single unit device comprising two structures acting in concert for effective drug administration to a host. One structure pertains to the reservoirs comprising a drug and formed of a drug release rate controlling material and the other structure relates to the matrix housing the reservoirs. The materials forming the reservoirs and the matrix of the device can be chemically and structurally different within a single device.

These two structures, comprising the unit drug delivery device, operate to effectively transfer drug from the device by first transferring drug from the reservoirs to the matrix, and secondly, by passing drug through the matrix to a drug recipient. The transfer of drug from the reservoirs and from the matrix can occur by a diffusion process and/or by a microporous flow process as hereinabove described, depending on the nature of the materials used for the reservoir walls and for the matrix.

In the diffusion process, the reservoirs and/or the matrix are formed from an essentially non-porous material which is itself permeable to the drug. The rate of passage of drug through such a material is generally dependent on the solubility of the drug therein, as well as on the thickness of the material. This means that selection of appropriate "diffusion" materials will also be dependent on the particular drug to be used. By varying the composition and thickness of the reservoir walls, the dosage rate per area of the device can be controlled.

Thus, through this invention, devices of the same matrix surface area, functioning by diffusion, can give different dosages of a drug by varying the characteristics of the reservoirs.

In the devices of the invention, the reservoir and/or the matrix may be formed from a microporous material such that the drug transfer mechanism is by microporous flow through a diffusive medium in the micropores. This drug transfer mechanism is referred to in the specification and the accompanying claims as a microporous flow process. The diffusive medium is a fluid phase comprised of a solution, a colloidal solution, or a suspension. The fluid phase can be polar, semi-polar or non-polar. In these diffusive mediums, the drug can have different degrees of solubility, to act in cooperation with the microporous material for achieving a controlled rate of drug permeation.

The diffusive medium may be a specifically added material or it may be a body fluid which enters the micropores when the device is placed in operation. A specifically added (non-body fluid) medium can be added by methods well known to the art, for example, by immersion of the microporous material in a bath of diffusive medium to let the medium partially fill or fully saturate the micropores of the material. Another method for charging the micropores with a diffusive medium is to encapsulate the drug mixed with a diffusive medium or a mixture of diffusive mediums so that the medium can flow from within the material into the pores to permit diffusive flow of the drug therethrough. Diffusive media suitable for the present purpose include fluids such as water, glycerin, ethylene glycol, propylene glycol, castor oil, olive oil, alcohols of 2 to 10 carbon atoms, halogenated hydrocarbons having 2 to 10 carbon atoms, aldehydes and ketones having 4 to 10 carbon atoms, syrups, and the like. Additionally, a plasticizer used to manufacture the reservoir and/or the matrix can act as the diffusive medium for the passage of the drug therethrough. Exemplary plasticizers suitable for employment for the present purpose are the commercially available plasticizers conventionally used for the manufacture of polymeric materials such as diethyl adipate, di-isobutyl adipate, di-n-hexyl adipate, di-isooctyl adipate, di-n-hexyl azelate, di-2-ethylhexylazelate, ethylene glycol dibenzoate, acetyl tri-n-butyl citrate, epoxidized soy bean oil, glycerol monoacetate, diethylene glycol dipelargonate, propylene glycol diluarate, iso-octyl palmitate, triphenyl phosphate, and the like. Other representative mediums are set forth in Remington's Pharmaceutical Science, pages 246 to 269 and 1,338 to 1,380, 1,970, Mack Publishing Company, Easton, Pa.

As noted, the diffusive medium may also be a body fluid added by contracting the device with a body tissue, for example, the mucous membranes of the anus, mouth or vagina, that can make available its intracellular and/or extracellular body fluid; or directly with a body fluid, for example, the fluid present in the stomach.

Materials comprising the reservoirs are chemically and/or structurally different than the materials comprising the matrix, so that the rate of drug permeation from the reservoirs is lower than the rate of permeation through the matrix. Generally, for the practice of this invention, the ratio of the drug permeation rate through the matrix material to the drug release rate through the reservoir wall material should be from 100:1 to 2:1 and preferably from 10:1 to 2:1. Of course, the invention is not so limited to these release rates so long as the passage through the reservoir walls is the rate controlling step.

For either of the above-discussed mechanisms, the transfer or rate of release of drug from the reservoirs is the release rate controlling step for the drug delivery system. The reservoirs remain substantially at the thermodynamic activity corresponding to that of the pure drug until substantially all of the drug has been released from the reservoir. This causes the rate of release to remain constant. To achieve this constant rate of release, however, the rate of drug release from the reservoirs and thus the rate of drug passage through the matrix should be less than the rate of clearance of released drug from the exterior surface of the matrix. This ensures that the drug delivery rate is dependent on the rate of release of drug from the reservoirs which can be controlled, rather than upon clearance of drug from the device in vivo, which varies.

The term "reservoir" as used in the specification and the accompanying claims refers to a "drug carrier phase," or to a "a medium supplying drug." The reservoir is comprised of a drug confined within a drug release controlling material. The reservoir can assume various embodiments, such as a drug-filled microcapsule or fiber, or both. When the reservoir is a drug-filled microcapsule, it can take the form of a hollow container of drug release rate controlling material having a drug therein. Alternatively, the microcapsule can be a solid particle of a drug release rate controlling material (solid or microporous) having a drug distributed therethrough.

The materials suitable for fabricating the microcapsules, whether of hollow or solid, porous or non-porous structure, are generally those materials capable of forming walls, membranes with or without pores or voids, or coatings through which the drug can pass at a controlled rate by the process of diffusion or by microporous flow. To achieve the desirable constant (or zero order) rate of flow the rate controlling materials must be essentially non-crushable so as to remain intact throughout the period of drug release. Rupture or collapse of microcapsules of these materials is to be avoided as the resulting drug release would be a pulse, rather than a controlled continuous and preferably constant release. Likewise, generally, the use of rapidly dissolving materials or materials highly soluble in body fluids is to be avoided since dissolution of the reservoirs in the matrix of the device would affect the constancy of the drug release, as well as the capability of the system to remain in place for certain uses. Suitable materials for forming the reservoirs include naturally occurring and synthetic materials. Preferably these materials are biologically compatible with body fluids, and tissues, though this feature is not critical since the reservoirs do not directly contact the body being carried within a matrix.

Exemplary materials suitable for fabricating the rate controlling microcapsules include poly(methymethacrylate), poly(butylmethacrylate), plasticized or unplasticized poly (vinylchloride), plasticized nylon, plasticized soft nylon, plasticized poly(ethylene terephthalate), natural rubber, poly(isoprene), poly(isobutylene), poly(butadiene), poly (ethylene), poly(tetrafluoroethylene), poly(vinylidene chloride), poly(acrylonitrile), poly(vinylpyrrolidone), poly(vinyl methyl ether), poly(trifluorochloraethylene), poly(4,4'-isopropylidene diphenylene carbonate), sodium (polystyrene sulfonate) copolymers such as ethylene-vinyl acetate, vinylidene chloride acrylonitrile, vinyl chloride diethyl fumariate, and the like. Examples of other materials include silicone rubbers, especially the medical grade poly(dimethylsiloxanes), and silicone-carbonate copolymers; hydrophilic polymers such as the hydrophilic hydrogels of esters of acrylic and methacrylic acid (as described in U.S. Pat. Nos. 2,976,576 and 3,220,960 and Belgian Pat. No. 701,813), modified collagen, cross-linked poly (vinylalcohol), cross-linked partially hydrolyzed poly(vinylacetate). Other polymeric membranes that are biologically compatible and do not adversely affect the drugs can be used.

To provide the microcapsule reservoirs, particles or solutions of drugs can be encapsulated with thin coatings of the encapsulating material to form microcapsules having an interior chamber containing the drug. Alternatively, the encapsulating material can be uniformly impregnated with the drug or drug solution, or a mixture of drugs, to form microcapsules which are a matrix having the drug distributed therethrough. If desired, particles of a known drug carrier, such as starch, gum acacia, charcoal, gum tragacanth, calcium carbonate, poly(vinylchloride), and the like, can be impregnated with the drug and encapsulated with another material such as the encapsulating materials previously discussed. These latter materials then function as the membrane which meters the flow of drug to the matrix.

Any standard encapsulation or impregnation techniques can be used to prepare the microcapsules. Drug can be distributed through encapsulating material by mixing or by impregnation. Subsequently, the solid material can be reduced to fine microcapsules by grinding, each of the microcapsules comprising drug coated with and distributed through the encapsulating material. Alternatively, fine particles or solutions of the drug can be encapsulated with a coating such as by suspending dry particles of the drug in an air stream and contacting that stream with a stream of encapsulating material that coats the drug particles with a membrane.

Alternatively, a coacervation technique may be used. The coacervation technique consists essentially of forming three immiscible phases, a liquid manufacturing phase, a core material phase and a coating phase. The coating phase is deposited as a liquid on the core material and rigidized usually by thermal, cross-linking or desolvation techniques, to form microcapsules. Microcapsules, made by the above technique, have an average particle size of from several tenths of a micron to 5,000 microns. Particle size, however, is not critical to the practice of the invention. Other suitable techniques for preparing microcapsules, such as the classic Bungenberg de Jong and Kaas method are reported in Biochem. Z, Vol 232, pages 338 to 345, 1931; Colloid Science, Vol 11, "Reversible System," edited by H. R. Kruyt, 1949, Elsevier Publishing Company, Inc., New York; J. Pharm. Sci., Vol 59, No. 10, pages 1,367 to 1,376, 1,970 and, Remington's Pharmaceutical Science, Vol XIV, pages 1,676 to 1,677, 1,970, Mack Publishing Company, Easton, Pa.

The reservoir may also take on a fiber form. The fibers forming the drug reservoirs may be of natural or synthetic origin and can have a wide variety of structures, (such as solid, hollow, porous, and the like) and geometric shapes (such as round, oval, square, trilobal, and the like). The fibers can effectively function as a reservoir by having drug dispersed therethrough, or by being hollow with drug contained therein. Suitable fibers can be made by conventional fabrication techniques. For example, fiber material and the drug may be dissolved in a solvent, extruded through small holes of a die and then solidified by standard melt spinning, wet spinning or dry spinning. In another embodiment, the fibers can be produced by pumping a melt of fiber and drug through a spinneret. With such a method, fiber diameter may be varied from a few tenths of a micron to a millimeter or so by down-drawing or by up-drawing. The reservoir can also be comprised of fibers of mixed denier. The fibers forming the reservoir can be filled, saturated, or semi-filled with drug by immersing, soaking, spraying or the like the fibers with drug, and permitting the desired amount of drug to transfer into the fiber to form a drug reservoir. Other techniques for forming fibers are set forth in U.S. Pat. No. 3,228,887 and in Encyclopedia of Science and Technology, Vol 5, pages 263 to 276, 1971, published by McGraw Hill Co., New York.

The materials suitable for forming the fibers are those materials possessing drug release rate controlling properties as discussed above and having the ability to house drug.

Exemplary materials for fabricating fibers are materials described as suitable encapsulating materials. Additionally, other suitable materials permeable to the passage of drug include copolymers such as acrylonitrile/dithioglycidol, acrylonitrile/ethylene oxide, poly(vinyl butyral) comprised of 11 to 45% free hydroxyls, anisotropic permeable microporous membranes of ionically associated polyelectrolytes, the polymers formed by the coprecipitation of a polycation and a polyanion as described in U.S. Pat. Nos. 3,276,589; 3,541,005; 3,541,006; 3,546,142; and the like; treated aliphatic polyamides as in U.S. Pat. Nos. 2,071,253; 2,966,700; 2,999,296; and the like; natural gums such as guar, acacia, pectins, and the like. Also, materials such as starch, regenerated cellulose, cellulose diacetate, cellulose triacetate, regenerated proteins, polyurethanes, polydinitrites, polyarylenes, polycarbonates and the like.

The matrix is generally formed of those materials which will pass drug molecules and which have the ability to house the reservoirs. The matrix material may have various shapes and forms, in conformity with the design of the drug delivery device. The matrix can be made from naturally occurring or synthetic materials, or a mixture of both. Generally, the preferred materials are those that are biologically compatible with body fluids, tissues or organs as are contacted by the drug delivery device, and that do not adversely affect the drug.

The matrix can be made from the materials listed above as suitable drug release rate controlling materials by first selecting a material for the reservoirs that releases drug at a lower rate than does the material used to make the matrix. With this relationship in mind, the matrix and the reservoirs can be made from microporous materials having a pore size of several hundred microns or larger, down to several angstroms, for example, regenerated cellulose, polyelectrolytes and the like with a pore size of 7 to 50 A, cellulose, cellulose esters, epoxy resins, poly(olefins), poly(vinylchlorides) with a pore size of about 50A to 150 microns or larger made by leaching out incorporated salts, soap micelles, starch and the like.

The matrix of the drug delivery device is easily fabricated. For example, the reservoirs can be mixed with the matrix forming material, which can be in solid, semi-solid, or liquid form at the time of mixing, by ball-milling, calendering, stirring, shaking and the like. Where the reservoirs are generally compatible with monomers or prepolymers used to form the matrix, the reservoirs can be added at this earlier stage of formation, and the matrix formed in situ. The matrix material, however made and having the reservoirs distributed therethrough, can then be formed to a given drug design by molding, pressing, extruding or like processes. Also, depending on the material used to form the matrix, the monomers may, if needed, be cured at this stage of manufacture. The ability to design and shape the matrix into tubes, rods, discs, films, rings and other highly reproducible shapes of controllable composition, readily results in fabrication of drug delivery devices with controlled characteristics and thus overcomes a significant disadvantage of previously described devices.

The rate of release of a drug from various materials can easily be determined by those skilled in the art. In this manner, particular materials for use as the drug release rate controlling barrier of the reservoirs and the matrix can be selected. Various techniques, such as the transmission method, the sorption/desorption method, the volume method, the pressure method, and the like can be used as measurers of permeability. One technique that has been found to be eminently well suited is to cast or hot press a film of the material to a thickness in the range of 2 to 60 mils. The film is used as a barrier between a rapidly stirred (e.g., 150 r.p.m.) saturated solution of the drug and a rapidly stirred solvent bath, both maintained at constant temperature (typically 37°C). Samples are periodically withdrawn from the solvent bath and analyzed for drug concentration. By plotting drug concentration in the solvent bath versus time, the permeability constant P of the material is determined by Fick's First Law of Diffusion.

$$\text{Slope of plot} = \frac{Q_1 - Q_2}{t_1 - t_2} = \frac{P\,AC}{h}$$

wherein
$Q_1$ = cumulative amount of drug in solvent in micrograms at $T_1$
$Q_2$ = cumulative amount of drug in solvent in micrograms at $t_2$
$t_1$ = elapsed time to first sample, i.e., $Q_1$
$t_2$ = elapsed time to second sample, i.e., $Q_2$
$A$ = area of membrane in $cm^2$
$C$ = initial concentration of drug
$h$ = thickness of membrane in cm.

By determining the slope of the plot, i.e.

$$\left[\frac{Q_1 - Q_2}{t_1 - t_2}\right]$$

and solving the equation using the known or measured values of A, C and h, the permeability P constant in $cm^2$/time of the material for a given drug is readily determined. Of course, this permeability constant is an inherent characteristic of the material and is unchanged whether the material is used as the matrix or the drug release rate controlling barrier of the reservoirs.

Using the above technique, the permeability constant P of progesterone from isotonic solution through different materials into isotonic solution at 37°C was found to be:

| Membrane | Permeability Constant ($cm^2$/hr) |
| --- | --- |
| Poly(dimethylsiloxane) | $8.0 \times 10^{-2}$ |
| Poly(ethylene) | $4.7 \times 10^{-4}$ |

Using the above technique and data to design a device of the invention to release progesterone, one would employ poly(ethylene) as the drug release rate controlling material of the reservoirs and the poly(dimethylsiloxane) as the matrix. The poly(dimethylsiloxane) used above is commercially available Silastic 340 of the Dow Corning Co., and the poly(ethylene) is low density with a melt index of 0.85. These examples and like examples can be used to determine the rate of drug release through different drug release controlling materials by easily ascertained standard techniques as are recorded in J. Pharm. Sci., Vol 52, pages 1,145 to 1,749, 1,963; ibid. Vol 53, pages 798 to 802, 1,964; ibid. Vol 54, pages 1,459 to 1,464, 1,965, ibid. Vol 55, pages 840 to 843 and 1,224 to 1,239, 1,966; Encyl. Polymer Sci. Technol., Vol 5 and 9, pages 65 to 82 and 794 to 807; and the references cited therein.

In the specification and the accompanying claims, the term "drug" broadly includes, without limitation, physiologically or pharmacologically active substances for producing a localized or systemic effect or effects in animals, especially mammals. The active drugs that can be administered by the drug delivery device of the invention include, without limitation: for example, drugs acting on the central nervous system such as, hypnotics and sedatives such as pentobarbital sodium, phenobarbital, secobarbital, thiopental, etc.; heterocyclic hypnotics such as dioxopiperidines, and glutarimides; hypnotics and sedatives such as amides and ureas exemplified by diethylisovaleramide and α-bromoisovaleryl urea and the like; hypnotics and sedative alcohols such as carbomal, naphthoxyethanol, methylparaphenol and the like; and hypnotic and sedative urethans, disulfanes and the like; psychic energizers such as isocarboxacid, nialamide, phenelzine, imipramine, tranylcypromine, pargylene and the like; tranquilizers such as chloropromazine, promazine, fluphenazine reserpine, deserpidine, meprobamate, benzodiazepines such as chlordiazepoxide and the like; anticonvulsants such as primidone, diphenylhydantoin, ethotoin, pheneturide, ethosuximide and the like; muscle relaxants and antiparkinson agents such as mephenesin, methocarbomal, trihexylphenidyl, biperiden, levo-dopa, also known as L- dopa and 1-β-3-4-dihydroxyphenylalanine, and the like; analgesics such as morphine, codeine, meperidine, nalorphine and the like; anti-pyretics and anti-inflammatory agents such as aspirin, salicylamide, sodium salicylamide and the like; local anesthetics such as procaine, lidocaine, naepaine, piperocaine, tetracaine, dibucaine and the like; antispasmodics and antiulcer agents such as atropine, scopolamine, methscopolamine, oxyphenonium, papaverine, prostaglandins such as $PGE_1$, $PGE_2$, $PGF_{1\alpha}$, $PGF_{2\alpha}$, PGA and the like; antimicrobials such as pencillin, tetracycline, oxytetracycline, chlorotetracycline, chloramphenicol, sulfonamides and the like; anti-materials such as 4-aminoquinolines, 8-aminoquinolines and pyrimethamine; hormonal agents such as prednisolone, cortisone, cortisol and triamcinoline; androgenic steroids, for example, methyltestosterone, fluoximesterone and the like; estrogenic steroids, for example, 17β-estradiol and ethinyl estradiol; progestational steriods, for example 17α-hydroxyprogesterone acetate, 19-nor-progesterone, norethindrone and the like; sympathomimetic drugs such as epinephrine, amphetamine, ephedrine, norepinephrine and the like; cardiovascular drugs, for example, procainamide, amyl nitrate, nitroglycerin, dipyridamole, sodium nitrate, mannitol nitrate and the like; diuretics, for example, chlorothiazide, flumethiazide and the like; antiparasitic agents such as bephenium hydroxynaphthoate and dichlorophen, dapsone and the like; neoplastic agents such as mechlorethamine, uracil mustard, 5-fluorouracil, 6-thioquanine, procarbazine and the like; hypoglycemic drugs such as insulins, protamine zinc insulin suspension, and other art known extended insulin suspension, sulfonylureas such as tolbutamide, acetohexamide, tolazamide, and chlorpropamide, the biguanides and the like; nutritional agents such as vitamins, essential amino acids, essential fats and the like; and other physiologically or pharmacologically active agents. Also the drugs can be present as the pharmacologically acceptable derivatives, such as ethers, esters, amides, acetals, etc. that lend themselves to passage into the circulatory system. For highly water soluble drugs, it is preferable that the matrix or the reservoir, or both be formed from a material that is substantially impermeable to water to essentially prevent dilution of the drug by absorption of body fluids into the devices with an accompanying decrease in drug release rate. These derivatives can be prepared by art known techniques and then used in the practice of the invention. Of course, the drug derivative should be such as to convert to the active drug within the body through the action of body enzymes assisted transformations, pH, specific organ activities, and the like.

The amount of the drug present in the reservoirs, whether contained in microcapsules or fibers is generally not limited and it is an amount equal to or larger than the amount of a drug that on its release from the device is effective for bringing about the drug's desired effects for the desired period. Typical amounts of drug present in the reservoir of these drug delivery devices are: 11-desmethoxyreserpine about 5 to 40 mg in the reservoir; acetophenazine 100 to 200 mg in the reservoir; methoxypromizine 600 to 750 mg in the reservoir, emcylamate a reservoir amount of 1.5 to 2.0 gm; phenylglycodol a reservoir amount of 1.5 to 1.9 gm; about 160 to 250 mg of butabarbital in the reservoir; from 0.5 to 1.2 gm of methsuximide; from 20 to 40 mg of hydrolazine; about 50 to 100 mg of totazoline; and the like. Generally, the drug delivery devices made according to the invention can contain from about 250 nanograms to 50 grams of drug for releasing it at a controlled rate of from about 25 nanograms to about 25 grams of drug or larger amounts per day. Of course, other devices containing different amounts of drug for use for different time periods such as week, month and year are also readily made by the invention.

It will be appreciated by those versed in the art that the unique drug delivery device of this invention can provide for the programmed delivery of drug at a rate of delivery characterized by a zero order time dependence for a prolonged period of time. For example, the amount of drug in the reservoir can be 100 to 300 mg of thiopropzate for releasing 15 to 30 mg over a 24hour period; 200 to 400 mg in the reservoir of phenyltoloxamine for a release of 150 to 200 mg per day; 100 to 200 mg of papaverine in the reservoir for a topical release of 30 to 75 mg over a 24 hour period; 2.5 g to 4.0 g of mephenoxalone for a release of 1.0 to 1.5 g per day; 15 to 25 mg of tranylcypromane for a release of 10 to 15 mg as the standard dose; 1 to 2 gm of trimethadione present in the reservoir for a release administration of 0.5 to 1.0 g per day; prostaglandins, for example $PGE_1$, $PGE_2$, $PGA_1$, $PGA_{2\alpha}$, in amounts of 0.5 mg to 10 mg for release of 1 ng to 100 ng and the like; for progestogen, progesterone an amount of 0.01 to 20 mg; and the like.

The above drugs and other drugs can be present in the reservoir alone or in combination with pharmaceutical carriers. Suitable pharmaceutical carriers include, for example, sterile water, dextrose in water or saline, condensation products of castor oil and ethylene oxide combining about 30 to about 35 moles of ethylene oxide per mole of castor oil; lower alkanols, oils such as corn oil; glycols; and the like. The carrier may also contain adjuvants for preserving, stabilizing, wetting, emulsifying or the like.

The drug can also be mixed in the reservoir with a transporting agent, that is, a material that aids or assists the transport of drug from the device reservoir to the body being treated. Acceptable transporting aids do not adversely affect the host, the drug or other materials forming the drug delivery device. Suitable transporting aids may be found among lower organic compounds having generally from about 4 to 15 carbons. Exemplary transporting aids include aliphatic cycloaliphatic and aromatic hydrocarbons having from 5 to 12 carbon atoms, aldehydes and ketones having from 4 to 10 carbon atoms, N,N-di(lower)-alkyl acetamides of up to about 10 carbons, 4 to 12 carbon esters, halogenated or nitrated lower hydrocarbons, salicylates, polyalkylene glycol silicates and the like.

The following examples are presented to illustrate the present invention. They should not be considered as limiting the scope of the invention as other equivalent embodiments will be apparent in light of the present disclosure, drawings and accompanying claims.

EXAMPLE 1

A nasal anti-allergenic drug delivery device is prepared by first mixing with 10 g of dry corn starch having a particle size of from 5 to 7 millimicrons, 5 ml. of a rag weed pollen liquid extract containing biologically active microsolutes of the pollen. The mixing is continued in a bench V-blender until all the pollen liquid extract is absorbed by the starch. Next, a portion of the starch particles saturated with the liquid are suspended in a column of dry air in a Wurster fluidized bed coating apparatus and spray coated with a solution of regenerated, leached cellulose xanthate and then maintained in a fluidizing flow of dry air until the cellulose xanthate coating is dry. Next, the air flow is cut off and the coated starch particles fall to the bottom of the apparatus for collection.

The recovered particles are tiny drug reservoirs having biologically active material and a starch carrier surrounded and enclosed by a cellulose xanthate wall. This wall contains pores of about 24A diameter. A portion of these particles are placed in simulated nasal gluids and the rate of release of active material is measured and compared with the rate of release of active material from the starch particles which were not coated. The cellulose xanthate coated particles release active material at a slower substantially constant controlled rate (0 order time dependence). Thus, the cellulose xanthate coating functions as an active agent release rate controlling wall. A portion of the coated particles are dispersed through and trapped in a matrix of fine nylon fibers.

This matrix has a higher permeability to the active material (drug) than does the rate controlling wall. When this matrix containing the plurality of coated particles (reservoirs) is tested for release rate it shows substantially the same prolonged controlled release of drug that the reservoirs themselves exhibited.

EXAMPLE 2

A drug delivery device for the oral administration of vitamin A is prepared by first forming a prepolymer solution comprising 244 grams of 37% formaldehyde and 120 grams of urea (adjusted to a pH of 8) by mixing the ingredients at 70° for one hour. The prepolymer is then dilutued with 500 grams of water to produce a solution for forming microcapsules. Next, microcapsules containing vitamin A are prepared by adjusting a portion of the prepolymer to pH 5 and adding while stirring 32 grams of vitamin A, and then lowering the pH to 3 – 4 with continual mixing to disperse the vitamin A. Next, the mixture is heated to about 45°C for about 1 hour and then cold water is added to bring the total volume to about 300 ml, and one-half of the resulting slurry is filtered to produce 24 grams of microcapsules. The remaining suspension is filtered a day later and air dried to give about 20 grams of microcapsules. The newly formed microcapsules are free flowing with a size of about 75 to 150 $\mu$. When placed in a simulated gastric environment, these microcapsules release vitamin A at a controlled, sustained, substantially constant rate, as compared with unencapsulated vitamin A.

Next, 25 parts by weight of the microcapsules are mixed with 70 parts by weight of polydimethylsiloxane, 5 parts by weight of silicone oil and 0.25 parts by weight of stannous octoate catalyst. The mixture is then cast in an elongated cylindrical mold having an inside diameter of 0.125 inches, divided into sections of 12 mm length and allowed to cure for 30 minutes. The resulting drug delivery device consists of microcapsule rservoirs of vitamin A enclosed in a siicone matrix. This device releases the vitamin A at substantially the same controlled rate as do the microcapsules themselves, showing that the matrix's permeability to the drug is higher than is the microcapsule walls'. When taken orally, this device releases a controlled substantially constant flow of vitamin A to its user over a prolonged period of time.

EXAMPLE 3

A drug delivery device for releasing harmone into the vagina is prepared as follows: first, 15 grams of a mixture of norethindrone and medroxyprogesterone acetate on an inert carrier are injected into a vertical, conical column of dry air. The air, carrying a coating material of 10 grams of a copolymer of 67 parts by weight of ethylene and 33 parts by weight of vinyl acetate dissolved in 50 ml of chloroform is introduced at the bottom of the column at a velocity high enough to suspend the particles. The coating material is sprayed onto the supported particles in a fine mist from a controllable nozzle located near the bottom of the column. The particles are coated in about 2 hours at room temperature, then the air flow temperature is increased to 50°C to dry the coated particles, now microcapsules containing the mixture of harmones.

Next, a 3.2 gram portion of the newly-prepared microcapsules is thoroughly mixed with 23 g of medical grade polydimethyl-siloxane elastomer and 5 g of the mixture aliquoted therefrom Then, 1 to 2 drops of stannous octoate catalyst are added to the aliquot, the ingredients mixed, and then poured into an intravaginal rectangular mold formed of two parts. The two parts are tightened to each other and the mold contents are cured at 40$^c$ to 50°C for 2 hours. The final cured product (or drug delivery device) is a 10 × 10 × 70 mm rectangular silicone matrix containing a plurality of microcapsule reservoirs. Placement of this device in the vaginal tract of a mammal supplies an effective amount of hormone at a controlled and essentially constant rate for the control of fertility.

EXAMPLE 4

Repeating the general procedure described in Example 3, but using different materials and a different mold, an intrauterine contraceptive device is madae of a drug permeable, solid, silicone elastomer matrix designed in the shape of a 1½ S, which is similar to the shape disclosed in U.S. Pat. No. 3,250,271, and having dispersed throughout progesterone. The progesterone is microencapsulated with drug-permeable but drug release rate controlling poly(ethylene). The microcapsules have a diameter of 50 microns and a wall thickness of 5 microns. A drug delivery device made according to this procedure with a drug loading of 1% of the total volume will release about 70 micrograms of progesterone per $cm^3$ of device per day for about 100 days.

EXAMPLE 5

A drug delivery device suitable for use as a tampon and comprised of silicone elastomer matrix having distributed throughout a plurality of reservoirs wherein each reservoir is a discrete hollow fiber of release rate controlling material containing a drug within, for example, hydrocortisone, would be manufactured to the procedures for making hollow fibers, such as by melt, dry or evaporative wet spinning procedures using spinnerets of a design that is apt for the purpose as set forth in British Pat. No. 514,638 and U.S. Pat. No. 3,228,877. For example, hollow fibers of cellulose triacetate would be produced by a wet spinning process in which the cellulose triacetate is first dissolved in a solvent to form a viscous spinning solution, after which the spinning solution is extruded into a coagulation bath to continuously form hollow, walled fibers. Then, the lumen of the hollow fiber is filled with drug and water and the ends are sealed. By controlling the conditions as set forth in the patents, hollow fibers with a wall thickness in the range of 2 to about 20 microns may be prepared for use as a reservoir. The fibers can be made in preselected lengths of a few millimeters to a couple of centimeters or larger. When confined within a silicone matrix as above described, the fibers act as the release rate controlling barriers.

EXAMPLE 6

A drug delivery device for the controlled, oral administration of water-soluble prednisolone is prepared as follows: first, a plurality of drug reservoirs comprising porous, discrete particles of polymerized poly(vinyl chloride) of about 100 microns diameter are prepared by mixing 100 g of suspension grade poly(vinyl chloride) resin wiith 50 g of octyl diphenyl phosphate and 10 g of prednisolone disodium phosphate at room temperature into a sticky, wet mass. Next, the temperature of the mixture is raised to 80°C for about 3 to 7 minutes, while stirring, to form dry, free flowing, discrete drug reservoirs. The reservoirs are uniformly dispersed through a matrix by mixing 50 g of reservoirs containing the prednisolone with 140 g of polydimethylsiloxane, 10 g of silicone oil, and 0.5 g of stannous octoate. After mixing the ingredients, the mixture is charged into pill molds and allowed to cure for 30 minutes. Oral administration of the resulting device yields a controlled essentially constant rate of release of prednisolone phosphate to the gastrointestinal tract to give a more uniform blood level of prednisolone over a longer period of time than is achieved when prednisolone alcohol is administered by standard prior art pills.

EXAMPLE 7

Following the procedure of Example 6, a plurality of porous drug reservoirs comprised of commercially available, prepolymerized particles of poly(vinyl chloride) having prednisolone distributed therethrough is prepared by mixing 100 milligrams of prednisolone disodium phosphate, 1930 milligrams of poly(vinyl chloride) particles, 260 milligrams of standard grade starch binder, 50 milligrams of lubricant sodium benzoate and 200 milligrams of sodium caprylate solubilizing agent. The mixing is continued until a homogenous mixture is formed. Next, the mixture is pressed and then sieved through a No. 200 sieve to give reservoirs of about 75 microns containing the drug. The reservoirs are then distributed in a matrix as in Example 6 to provide a drug delivery device.

EXAMPLE 8

To give 100 grams of 2-hydroxyethyl methacrylate is added 100 grams of water, 0.2 grams of tertiary butyl peroctoate, 0.2 grams of ethylene glycol dimethacrylate and 4 grams of sodium bicarbonate and the mixture heated at 70°C, under an inert atmosphere to yield a solid, friable polymeric foam. The foam is ground into fine particles of 20 micron average size. 10 grams of the particles are mixed with 2 grams of neomycin in a 50:50 ethyl alcohol/water solvent, and the resultant mixture placed on a mechanical roller until the polymeric particles absorb the drug to form a plurality of drug reservoirs. The solution is filtered and the reservoirs gently dried under a stream of dry air. The reservoirs containing the drug are mixed with 100 grams of suspension grade poly(vinyl chloride) and 50 grams of octyl diphenyl phosphate at room temperature and the mixture is charged into a mold. The temperature is raised to 80°C for 5 minutes to give a solid, poly(vinyl chloride) matrix having a plurality of polymeric acrylate reservoirs containing the drug neomycin therein. This drug delivery device is in accord with this invention and can be implanted subcutaneously for controlled release of the drug.

EXAMPLES 9 to 17

Other drug delivery devices made according to the procedure set forth in the previous examples include the following: an intrauterine drug delivery device comprising a plurality of reservoirs made of suspension grade poly(vinyl chloride) with the active drug component in the reservoirs being progesterone and the reservoirs contained in a silicone matrix; an intrauterine drug delivery device comprising a plurality of reservoirs made of suspension grade poly(vinyl chloride) with the drug in the reservoirs progesterone and the matrix containing the reservoirs formed of ethylene vinyl acetate copolymer wherein vinyl acetate is 33% of the copolymer; an intrauterine drug delivery device wherein the reservoirs are made from finely ground radiation cross-linked ethylene vinyl acetate (18% vinyl acetate) with the reservoirs containing progesterone and the matrix silicone; an intrauterine drug delivery device comprising a plurality of reservoirs formed from finely ground radiation cross-linked poly(cis-1,4-polyisoprene) with progesterone in the drug reservoirs and the matrix formed from silicone; an ocular insert drug delivery device consisting of pilocarpine liquid finely dispersed in ethylene vinyl acetate copolymer reservoirs having an 18% vinyl acetate content with the reservoirs in a matrix of ethylene vinyl acetate copolymer comprising 35% vinyl acetate; a drug delivery device comprising a non-thrombogenic hydrocephalus shunt consisting of a plurality of reservoirs that serve as a dispersed drug carrier and are formed of polyester microencapsulated around heparin with the reservoirs dispersed in a silicone matrix; a drug delivery device for oral use shaped as a drug administering elastic rubber band wherein the plurality of reservoirs comprise poly-(ethylene) microencapsulated around any drug with the reservoirs contained in a radiation cross-linked poly(cis-1,4-polyisoprene) matrix; a drug delivery device designed as a Stan-Edwards heart valve comprising high density poly(ethylene) microencapsulated around a drug reservoir, with a plurality of reservoirs distributed throughout a silicone matrix; and, a drug delivery device manufactured as a suture comprising a plurality of reservoirs formed of polyamide microencapsulated around a drug, for example, zepheran, and the reservoirs in a nylon matrix.

I claim:
1. A drug delivery device which releases drug continuously at a controlled rate over a prolonged period of time when administered to an animal comprising:
   a. a plurality of reservoirs each comprising
      i. a drug confined within
      ii. a drug release rate controlling material permeable to the drug by diffusion, microporous flow or a combination thereof, said drug release rate controlling material being essentially insoluble in body fluids and essentially non-crushable under the conditions of administration and, with the proviso that if said drug is highly water soluble, substantially impermeable to body fluids; dispersed in
   b. a matrix formed of a material permeable to said drug at a rate greater than the rate of permeability of the drug through said drug release rate controlling material so that the rate of drug permeation through said drug release rate controlling material determines the rate of release of drug from the device;

whereby when the device is administered said reservoirs remain intact and release drug by diffusion, microporous flow or a combination thereof continuously at a controlled rate for said prolonged period.

2. The drug delivery device in accordance with claim 1 wherein the reservoir material is essentially imperforate and is permeable to the passage of drug by the process of diffusion.

3. The drug delivery device in accordance with claim 2 wherein the reservoirs are fibers.

4. The drug delivery device in accordance with claim 2 wherein the reservoirs are microcapsules.

5. The drug delivery device in accordance with claim 4 wherein the rate at which the drug permeates the matrix is in the range of from 10 to 2 times as great as the rate at which the drug diffuses through the reservoir material.

6. The drug delivery device in accordance with claim 1 wherein the reservoir material is microporous and is permeable to the passage of drug by microporous flow through fluid in the micropores.

7. The drug delivery device in accordance with claim 6 wherein the reservoirs are fibers.

8. The drug delivery device in accordance with claim 6 wherein the reservoirs are microcapsules.

9. The drug delivery device in accordance with claim 8 wherein the fluid in the micropores is a body fluid.

10. The drug delivery device in accordance with claim 8 wherein the fluid in the micropores is a specifically added material.

11. The drug delivery device in accordance with claim 1 wherein said reservoirs are distributed homogeneously through said matrix.

12. The drug delivery device in accordance with claim 4 wherein said microcapsules are distributed homogeneously throughout the matrix.

13. An intrauterine drug delivery device comprising a matrix of silicone elastomer having a plurality of drug reservoirs dispersed therethrough, the reservoirs comprising progesterone particles each microencapsulated within a drug release rate controlling polyethylene wall.

* * * * *